Nov. 29, 1938.   DU BOIS EASTMAN   2,138,758
MANUFACTURE OF CARBON DIOXIDE ICE
Filed June 15, 1935
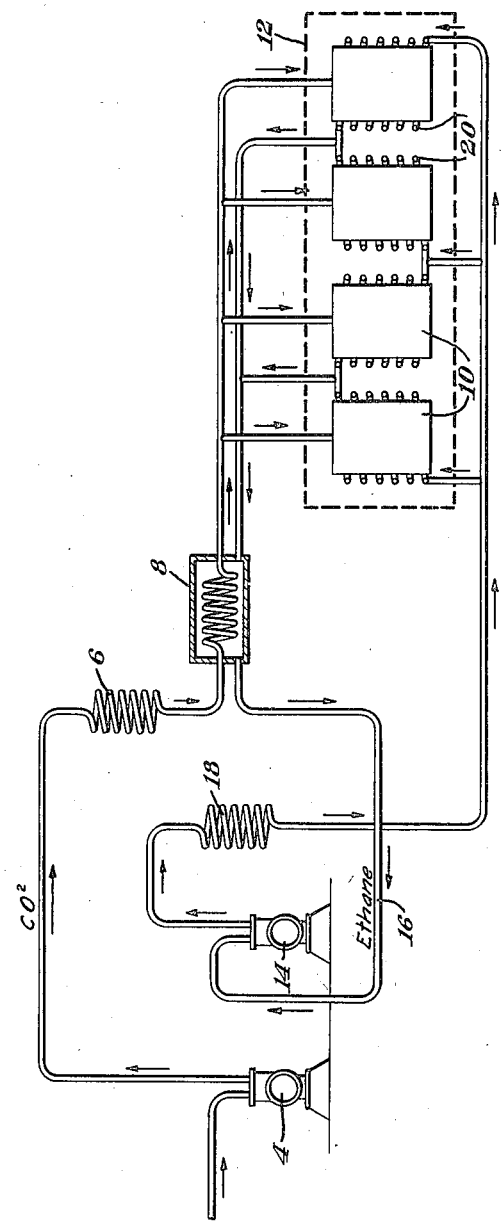
du Bois Eastman
INVENTOR
BY R. J. Dearborn
his ATTORNEY Patented Nov. 29, 1938

2,138,758

UNITED STATES PATENT OFFICE 2,138,758

MANUFACTURE OF CARBON DIOXIDE ICE

Du Bois Eastman, Port Arthur, Tex., assignor to The Texas Company, New York, N. Y., a corporation of Delaware Application June 15, 1935, Serial No. 26,744

3 Claims. (Cl. 62—121)

This invention relates to a method of preparing clear solidified carbon dioxide.

As heretofore marketed $CO_2$ has been congealed by permitting the gas to expand into suitable tanks or other receptacles, the cooling effect of expanding the gas from a higher to a lower pressure causing a portion of the $CO_2$ to congeal into light flakes similar to snow. These flakes are then compressed and marketed as dry ice. The present invention is distinguished from the customary procedure by directly freezing liquid $CO_2$ into a clear solid ice, thus avoiding the complication and heat losses incident to compressing $CO_2$ snow, as well as furnishing a more compact product.

In carrying out the invention a suitable refrigerating fluid capable of being expanded to produce a temperature below the melting point of $CO_2$ is employed. A fluid particularly suited for this purpose is ethane, which has a vapor pressure function, similar to $CO_2$ and which boils at atmospheric pressure well below the melting point of $CO_2$.

The invention will be fully understood by reference to the single figure of the drawing wherein there is illustrated more or less diagrammatically a simple apparatus which may be employed for carrying out the present invention.

The apparatus, as illustrated, includes a compressor 4 for receiving $CO_2$ and compressing the same through one or more stages to a high pressure, 1000 pounds per square inch absolute, for example. This degree of compression will raise the temperature of the compressed gas to approximately 250° F. At this point, being well above the critical temperature for $CO_2$ (88° F.), the material will be in the form of vapor. The compressed vapor is conducted through a cooler 6 which may be an atmospheric cooler or other type employing an extraneous cooling medium. The compressed gas is reduced in the cooler 6 to a temperature below its critical temperature, for example, 85° F., whereby the $CO_2$ assumes a liquid form as it approaches the refrigerating unit.

The liquefied $CO_2$ is then carried under pressure through a heat exchanger 8 where its temperature is materially reduced, a temperature of −56° F., for example, having been found feasible. The pressure may accordingly be reduced to approximately 100 pounds per square inch as the $CO_2$ passes from the heat exchanger 8 into the containers 10 of the refrigerating unit 12. The containers 10 are constructed to accommodate a working pressure of at least 100 pounds per square inch. They are necessarily sealed during normal operation but are constructed to permit the independent removal of each container or are otherwise formed so that the cake of carbon dioxide ice may be removed from the container.

The refrigerating fluid, preferably ethane, is utilized in a closed cycle to prevent loss of refrigerating fluid in normal operation. This cycle includes a compressor 14 receiving the fluid from the conduit 16 at a low pressure, for example, 10 pounds per square inch absolute. The compressor 14 compresses the gas to approximately 600 pounds per square inch and raises the temperature to approximately 200° F. The fluid is then passed through a cooling device illustrated as an atmospheric cooler 18 for reducing the temperature to approximately atmospheric temperature, assumed to be 85° F. The fluid at 600 pounds pressure and 85° F. may then be carried directly to the expansion coils 20 positioned in the refrigerating unit 12, although it is contemplated to first reduce the temperature further before the fluid reaches the expansion coils if desired. The refrigerating fluid is reduced in pressure adjacent the coils 20 from 600 pounds to approximately 10 pounds per square inch. This causes a reduction in temperature of the refrigerating liquid to a temperature sufficient to freeze the carbon dioxide liquid in the containers 10. The refrigerating fluid is then carried through the heat exchanger 8 wherein it reduces the temperature of the incoming $CO_2$ to a point well below zero so that the pressure on the $CO_2$ may be reduced without vaporizing the same. The counterflow heat exchanger 8 increases the temperature of the refrigerating fluid to approximately 75° F. with little or no reduction in pressure therein. This gas is then returned to the compressor 14 and the cycle is repeated.

Ethane has been found to be a particularly useful refrigerating liquid for freezing carbon dioxide since its boiling point at various pressures corresponds closely with that of carbon dioxide yet at lower temperatures, sufficient to freeze the liquid $CO_2$, there exists a substantial temperature differential between the ethane and the $CO_2$. At a pressure below 40 pounds per square inch ethane has a boiling point substantially below that of carbon dioxide at 100 pounds pressure, the differential gradually increasing as the pressure is reduced. With a reduction in pressure from 600 pounds to 10 pounds and an initial temperature of from 20° to 90° F., a temperature of −120° F. or lower can be attained from the expanded ethane, this temperature being well below the freezing point of carbon dioxide.

While reference is made herein to specific temperatures and pressures suitable for carrying out the proposed invention, it will be understood that these are illustrative only and that other temperatures and pressures, as well as other refrigerating fluids, may be employed. Any refrigerating fluid having the general physical characteristics of ethane and which will produce a temperature sufficiently low to freeze the liquid $CO_2$ while the latter is maintained under a liquefying pressure will be satisfactory. Other refrigerating fluids which may be utilized in carrying out the invention are ethylene and ammonia.

Obviously, many other modifications and variations of the invention, as hereinbefore set forth, may be made without departing from the spirit and scope thereof, and therefore only such limitations should be imposed as are indicated in the appended claims.

I claim:

1. The method of freezing liquid carbon dioxide comprising maintaining the same in a liquid state at a relatively low temperature, providing a continuous closed cycle for a normally gaseous fluid of the type of ethane wherein said fluid is compressed, cooled by extraneous means and expanded under low pressure to produce a temperature below the melting point of said liquid carbon dioxide, the expanding fluid and liquid carbon dioxide being maintained in heat transfer relation for freezing the latter and passing said cooled expanded fluid in counter-current heat transfer relation to the liquid carbon dioxide before the latter is frozen by the expansion of said fluid.

2. The method of freezing liquid carbon dioxide comprising maintaining a charge of the same in a liquid state in a freezing compartment, compressing a fluid of the type of ethane, cooling the same by extraneous means and expanding and cooling said ethane in heat conducting relation to said compartment for transferring heat from said carbon dioxide to said fluid, and transferring heat from said liquid carbon dioxide to said fluid as said fluid is exhausted from the vicinity of said freezing compartment and prior to the entrance of the next succeeding charge of said carbon dioxide into said freezing compartment.

3. The method of freezing liquid carbon dioxide which comprises compressing carbon dioxide gas, cooling said compressed gas by extraneous means so as to produce liquid carbon dioxide, maintaining a charge of said carbon dioxide in a liquid state in a chamber, freezing said liquid carbon dioxide in said chamber by the expansion of a fluid of the type of ethane in heat conducting relation to said chamber and pre-cooling said liquid carbon dioxide by passing the same in heat conducting relation to the expanded fluid prior to the entrance of the next succeeding charge of said liquid carbon dioxide into said chamber.

DU BOIS EASTMAN.